May 1, 1951     R. G. OLSON, JR     2,551,505
CUSHIONING DEVICE
Filed Dec. 4, 1946
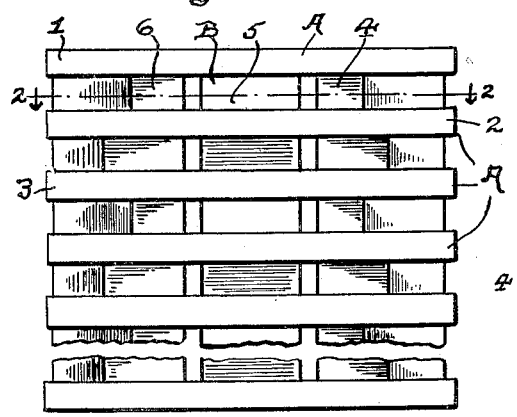
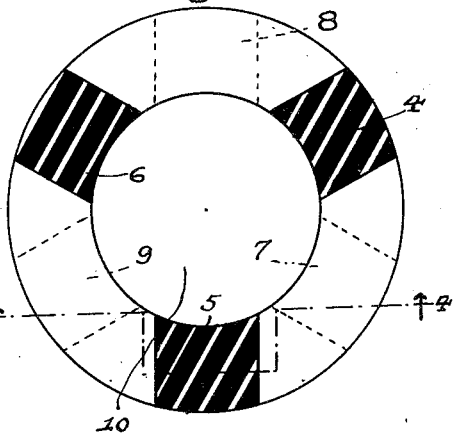
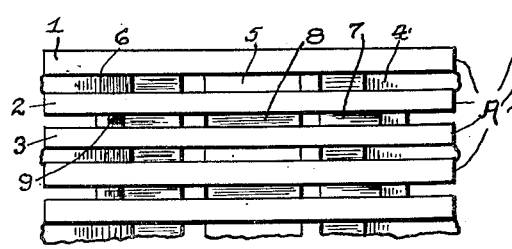
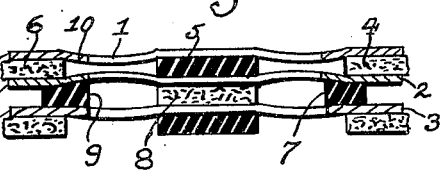
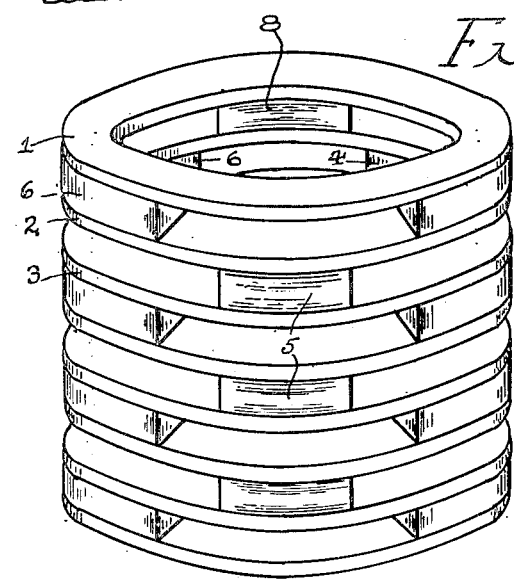
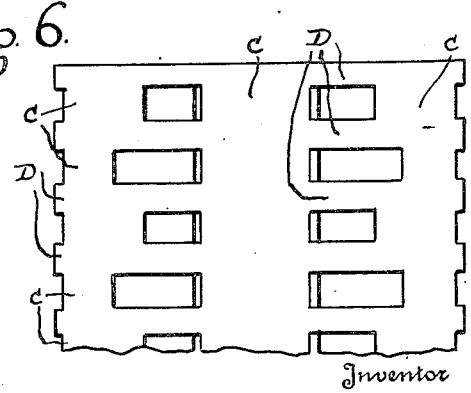
Inventor
R. G. Olson, Jr.
By Pattison, Wright & Pattison
Attorneys Patented May 1, 1951

2,551,505

UNITED STATES PATENT OFFICE 2,551,505

CUSHIONING DEVICE

Raymond G. Olson, Jr., Chevy Chase, Md.

Application December 4, 1946, Serial No. 713,997

7 Claims. (Cl. 267—22)

This invention relates to a cushioning device, and more particularly to such a device which in its general aspects partakes of the nature of a shock absorber and is both compressible and resilient.

The primary object of the invention is to provide a unitary device which is simple of construction, durable and highly efficient in operation and comparatively cheap of manufacture.

A still further object of the invention is to provide such a device which is both compressible and resilient in nature and operates to initially absorb shock or pressure rapidly by reason of its compressibility and secondarily by reason of its resiliency.

Further objects and advantages of the invention will appear from the following description when read in the light of the accompanying drawings wherein two embodiments of the invention are illustrated.

In the drawings:

Fig. 1 is a view in side elevation of the device.

Fig. 2 is a horizontal section on the line 2—2 of Fig. 1 looking in the direction indicated by arrows.

Fig. 3 is a fragmentary view in side elevation of the device in its compressed form.

Fig. 4 is a fragmentary view in side elevation of the device when it is both compressed and deformed.

Fig. 5 is a fragmentary view in side elevation of a modified form of the invention.

Fig. 6 is a perspective view of the device.

The invention is susceptible of many varied uses wherein it is desired to cushion or absorb a shock. The device is particularly well adapted for use in the field of aviation as for instance in combination with the shock strut of the landing gear of an airplane. Other obvious uses of the device would be that of a recoil absorber for guns; a resilient support for engines or any other construction or apparatus in which a cushioning support is desirable; and as a spring in the many constructions and machines in which springs are utilized.

Referring first to Figs. 1 to 4 inclusive of the drawings, A designates a plurality of plates or washers composed of a resilient material. Any resilient material may be utilized and the particular material selected as well as the thickness thereof would be largely determined by the particular use to which the device is to be put and the degree or amount of shock the device would be utilized to absorb. As metal discs or washers would be often times utilized, in the following description the discs will be referred to as being metallic in nature.

These discs are stacked, that is to say they are arranged in superposed parallel relationship, but are not stacked in the sense that they have actual engagement one with the other for the reason that they are held in separated relationship by a plurality of inserts or spacers which are composed of resilient compressible material such as rubber.

Generally these resilient compressible separators or inserts are designated by B but for the purpose of explaining their specific disposition in the construction certain of them will be given individual numerical identification.

The discs or washers A are illustrated as being circular in form but it is to be understood that the inventive concept is not to be so limited as square, rectangular, elliptical or other shaped discs could be equally well utilized.

Irrespective of the particular configuration of the discs the inserts or spacers B between each pair of discs are arranged in spaced relationship to one another so as to leave between the adjacent inserts a considerable extent of unsupported disc portion.

Identifying the three uppermost discs as 1, 2 and 3 rspectively it will be seen that there are three inserts or spacers 4, 5 and 6 arranged in spaced relationship between the discs 1 and 2. Referring to discs 2 and 3 it will be seen that they are similarly supported in spaced relationship by three inserts which are designated as 7, 8 and 9 which are spaced from one another a distance similar to the spacing between the aforementioned inserts 4, 5 and 6. The inserts 7, 8 and 9 are not in alignment with the inserts 4, 5 and 6 but are staggered in respect thereto.

Considering the inserts between each pair of discs as a set it will be seen that the inserts of each set are alternately staggered and aligned. The practical result of this is that the inserts 7, 8 and 9 engage the disc 2 at points beneath the unsupported portions of disc 1. Carrying this arrangement further throughout the height or length of the device the inserts below the disc 3 are in alignment with the unsupported portions of the disc 2. This arrangement of the parts probably most clearly appears in Fig. 4 of the drawings.

It is highly desirable that the device be a unitary structure and accordingly the inserts are firmly secured to their respective discs. This can be done by vulcanizing or in some other suitable way. Vulcanization of rubber to metal has progressed to a point where adequate sheer strength or resistance is attained between the inserts and the discs.

The length or height of the cushioning device is optional and will depend upon the particular use to which the device is to be put. The number of discs will to a large extent be determined by the load to which the device will be subjected.

The operation of the device will be readily understood by reference to Figs. 1, 3 and 4 of the drawings. When first subjected to load the parts will assume the positions appearing in Fig. 3 from which it will be seen that the rubber inserts have been compressed but that the form of the discs remains the same. The first and consequently the greatest load is absorbed by the compressible rubber inset separators which have a capability of absorbing this initial force or load rapidly and smoothly.

The remaining and final portion of the load is absorbed by the discs and after the rubber inserts have been totally compressed and have absorbed as much of the load as it is possible for them to absorb. A continued application of load to the cushioning device for absorption results in the distortion of the discs by deforming that portion of each disc which is unsupported. As the force or load is applied the construction permits, in fact causes, the discs to assume the wavy or corrugated contour shown in Fig. 4 of the drawings. The discs being made of resilient material spring or bow down between the spaced supporting elements. The degree or extent to which they bow is dependent upon the force or load to which they are subjected and upon the particular material out of which they are constructed.

Absorption of the load by the discs due to their distortion or bowing is much more gradual than is the absorption of the load by the resilient inserts. This results in a rapid compression or shortening of the cushioning device followed by a final absorption of the load by the distortion of the discs. This is a desirable operation in that the load force is brought to a gradual rather than an abrupt stoppage. An abrupt stoppage would be undesirable in many of the constructions in which the device is applicable.

The modified form of the invention appearing in Fig. 5 is exactly similar in mode of operation to that form of the invention already described. Here the device is molded or formed in a single piece and is composed of a resilient plastic material or any other suitable resilient material.

Accordingly the only difference between the modified form of the invention over the first embodiment described resides in the fact that the spacers or inserts C are formed as an integral part of the discs or washer-like portions D. These inserts are staggered just as previously described with the result that each of the discs has a portion of considerable length or extent which is unsupported, by which is meant, that there are several unfilled spaces beneath each disc-like member. Accordingly each of the discs when subjected to sufficient load and after the inserts have absorbed all the load that they can absorb will bend or bow downwardly into these spaces.

I claim:
1. A cushioning device comprising, a plurality of resiliently flexible non-compressible discs arranged in stacked relation and being supported in separated parallel relation to one another by a set of inserts between each pair of discs, each set of inserts comprising a like plurality of resilient compressible members arranged in spaced relation along the perimeter of the discs, and the inserts at opposite sides of each disc being in staggered relation.

2. A construction as defined in claim 1 wherein, the inserts are secured to the discs to provide a unitary device.

3. A cushioning device comprising, a plurality of resiliently flexible non-compressible washers arranged in stacked relation and being supported in spaced relation to one another by a set of inserts between each pair of washers, each set of inserts comprising a like plurality of resilient compressible members arranged in spaced relationship along the perimeters of the washers, and the inserts at opposite sides of each washer being in staggered relation.

4. A construction as defined in claim 3 wherein, the inserts are secured to the washers to provide a unitary device.

5. A construction as defined in claim 3 wherein, the washers are metallic and the inserts are composed of rubber.

6. A construction as defined in claim 3 wherein, the washers are metallic and the inserts are composed of rubber, and said inserts being vulcanized to the washers to provide a unitary device.

7. A cushioning device comprising, a plurality of resiliently flexible non-compressible metallic washers each provided centrally with an opening, said washers being arranged in stacked relation with their openings in alignment and being supported in spaced parallel relation to one another by a set of inserts positioned between each pair of washers, each set of inserts comprising a like plurality of resilient compressible members arranged in spaced relationship along the perimeters of the washers, and the inserts of the sets at opposite sides of each washer being arranged in staggered relation to one another.

RAYMOND G. OLSON, JR.

REFERENCES CITED

The following references are of record in the file of this patent:

UNITED STATES PATENTS

| Number | Name | Date |
|---|---|---|
| 18,630 | Colton | Nov. 17, 1857 |
| 1,108,488 | Bugg | Aug. 25, 1914 |
| 2,171,185 | Maier | Aug. 29, 1939 |
| 2,322,193 | Kaemmerling | June 15, 1943 |

FOREIGN PATENTS

| Number | Country | Date |
|---|---|---|
| 140,465 | Great Britain | June 20, 1921 |
| 659,821 | France | Feb. 11, 1929 |
| 587,498 | Germany | Nov. 3, 1933 |